United States Patent
Katayama et al.

(10) Patent No.: US 12,123,297 B1
(45) Date of Patent: Oct. 22, 2024

(54) MAGNETOMETER BIAS AND EDDY CURRENT COMPENSATION FOR DYNAMIC SURVEYING PRELIMINARY

(71) Applicant: Schlumberger Technology Corporation, Sugar Land, TX (US)

(72) Inventors: Makito Katayama, Cheltenham (GB); Edward Richards, Cheltenham (GB); Andrew Whitmore, Cheltenham (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 29 days.

(21) Appl. No.: 18/296,588

(22) Filed: Apr. 6, 2023

(51) Int. Cl.
*E21B 47/024* (2006.01)
*E21B 7/04* (2006.01)
*E21B 44/00* (2006.01)
*G01P 15/18* (2013.01)

(52) U.S. Cl.
CPC .............. *E21B 47/024* (2013.01); *E21B 7/04* (2013.01); *E21B 44/00* (2013.01); *G01P 15/18* (2013.01)

(58) Field of Classification Search
CPC ................................ E21B 47/024; E21B 7/04
See application file for complete search history.

(56) References Cited

U.S. PATENT DOCUMENTS

| | | | | |
|---|---|---|---|---|
| 5,012,412 A * | 4/1991 | Helm | ..................... | E21B 47/022 702/9 |
| 5,452,518 A * | 9/1995 | DiPersio | ................. | G01V 3/26 33/304 |
| 5,564,193 A * | 10/1996 | Brooks | ..................... | G01V 3/26 33/304 |
| 7,950,473 B2 * | 5/2011 | Sugiura | ................... | E21B 47/02 175/45 |
| 9,945,222 B2 | 4/2018 | Sugiura et al. | | |
| 9,982,525 B2 * | 5/2018 | Brooks | ................ | E21B 47/022 |
| 10,094,850 B2 * | 10/2018 | Brooks | ..................... | E21B 7/06 |
| 10,584,575 B2 * | 3/2020 | Brooks | ................ | E21B 47/022 |
| 10,641,077 B2 * | 5/2020 | Sullivan | ................. | E21B 44/00 |
| 10,890,062 B2 * | 1/2021 | Rodney | ................... | E21B 44/00 |
| 2004/0222019 A1 * | 11/2004 | Estes | ..................... | E21B 47/026 175/45 |

(Continued)

FOREIGN PATENT DOCUMENTS

CN 109633757 A * 4/2019 ............... G01V 3/10

*Primary Examiner* — Jennifer H Gay
(74) *Attorney, Agent, or Firm* — Jeffrey D. Frantz

(57) ABSTRACT

A method for drilling a subterranean wellbore includes rotating a bottom hole assembly (BHA) in the subterranean wellbore to drill, in which the BHA includes a drill collar, a drill bit, a roll-stabilized housing deployed in the drill collar and configured to rotate with respect to the drill collar, and triaxial accelerometer and triaxial magnetometer sets deployed in the roll-stabilized housing. Triaxial accelerometer and triaxial magnetometer measurements and a drill collar rotation rate measurement are made while the BHA rotates. A wellbore inclination and a gravity tool face of the roll-stabilized housing are computed from the triaxial accelerometer measurements. The computed inclination and gravity toolface, the triaxial magnetometer measurements, and the measured rotation rate of the drill collar are processed to compute an azimuth of the subterranean wellbore in which influences of eddy currents and magnetometer biases are accounted.

15 Claims, 9 Drawing Sheets

(56) References Cited

U.S. PATENT DOCUMENTS

| | | | |
|---|---|---|---|
| 2005/0199425 A1* | 9/2005 | Estes | H04L 63/0272 175/50 |
| 2010/0126770 A1* | 5/2010 | Sugiura | E21B 17/1014 175/45 |
| 2013/0124095 A1* | 5/2013 | Sugiura | E21B 44/00 702/9 |
| 2013/0151157 A1* | 6/2013 | Brooks | E21B 47/022 702/9 |
| 2013/0151158 A1* | 6/2013 | Brooks | E21B 47/022 702/92 |
| 2015/0378043 A1* | 12/2015 | Brooks | E21B 7/06 702/9 |
| 2018/0258702 A1* | 9/2018 | Marson | E21B 7/067 |
| 2018/0266237 A1* | 9/2018 | Brooks | E21B 47/022 |
| 2019/0353023 A1* | 11/2019 | Whitacre | G01V 3/38 |
| 2021/0108502 A1 | 4/2021 | Whitacre | |
| 2022/0136380 A1* | 5/2022 | Kuckes | E21B 7/064 175/24 |
| 2022/0251938 A1* | 8/2022 | Whitmore | E21B 7/06 |

\* cited by examiner

MAGNETOMETER BIAS AND EDDY CURRENT COMPENSATION FOR DYNAMIC SURVEYING PRELIMINARY

FIELD

Disclosed embodiments relate generally to surveying while drilling methods in rotary systems employing a roll-stabilized housing and more particularly to surveying methods for obtaining wellbore azimuth while drilling.

BACKGROUND

In conventional drilling and measurement while drilling (MWD) operations, wellbore inclination and wellbore azimuth are determined at a discrete number of longitudinal points along the axis of the wellbore. These discrete measurements may be assembled into a survey of the well and used to calculate a three-dimensional well path (e.g., using the minimum curvature or other curvature assumptions). Wellbore inclination is commonly derived (computed) from tri-axial accelerometer measurements of the earth's gravitational field. Wellbore azimuth (also commonly referred to as magnetic azimuth) is commonly derived from a combination of tri-axial accelerometer and tri-axial magnetometer measurements of the earth's gravitational and magnetic fields.

Static surveying measurements are commonly made after drilling has temporarily stopped (e.g., when a new length of drill pipe is added to the drill string) and the drill bit is lifted off bottom. Such static measurements are often made at measured depth intervals ranging from about 30 to about 90 feet. While these static surveying measurements may, in certain operations, be sufficient to obtain a well path of suitable accuracy, such static surveying measurements are time consuming as they require drilling to temporarily stop and the drill string to be lifted off the bottom of the wellbore.

While the use of dynamic surveying measurements is known, such measurements tend to be prone to error, for example, from magnetic interference such as eddy current induced magnetic fields and uncompensated magnetometer bias. There is a need in the industry for improved methods for making dynamic surveying, particularly, dynamic azimuth measurements while drilling.

SUMMARY

A method for drilling a subterranean wellbore is disclosed. The method includes rotating a bottom hole assembly (BHA) in the subterranean wellbore to drill, in which the BHA includes a drill collar, a drill bit, a roll-stabilized housing deployed in the drill collar and configured to rotate with respect to the drill collar, and a triaxial accelerometer set and a triaxial magnetometer set deployed in the roll-stabilized housing. Triaxial accelerometer and triaxial magnetometer measurements and a drill collar rotation rate measurement are made while the BHA rotates. A wellbore inclination and a gravity tool face of the roll-stabilized housing are computed from the triaxial accelerometer measurements. The computed inclination, the computed gravity toolface, the triaxial magnetometer measurements, and the measured rotation rate of the drill collar are processed to compute an azimuth of the subterranean wellbore, wherein influences of eddy currents and magnetometer biases are accounted for in the computed azimuth.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1:
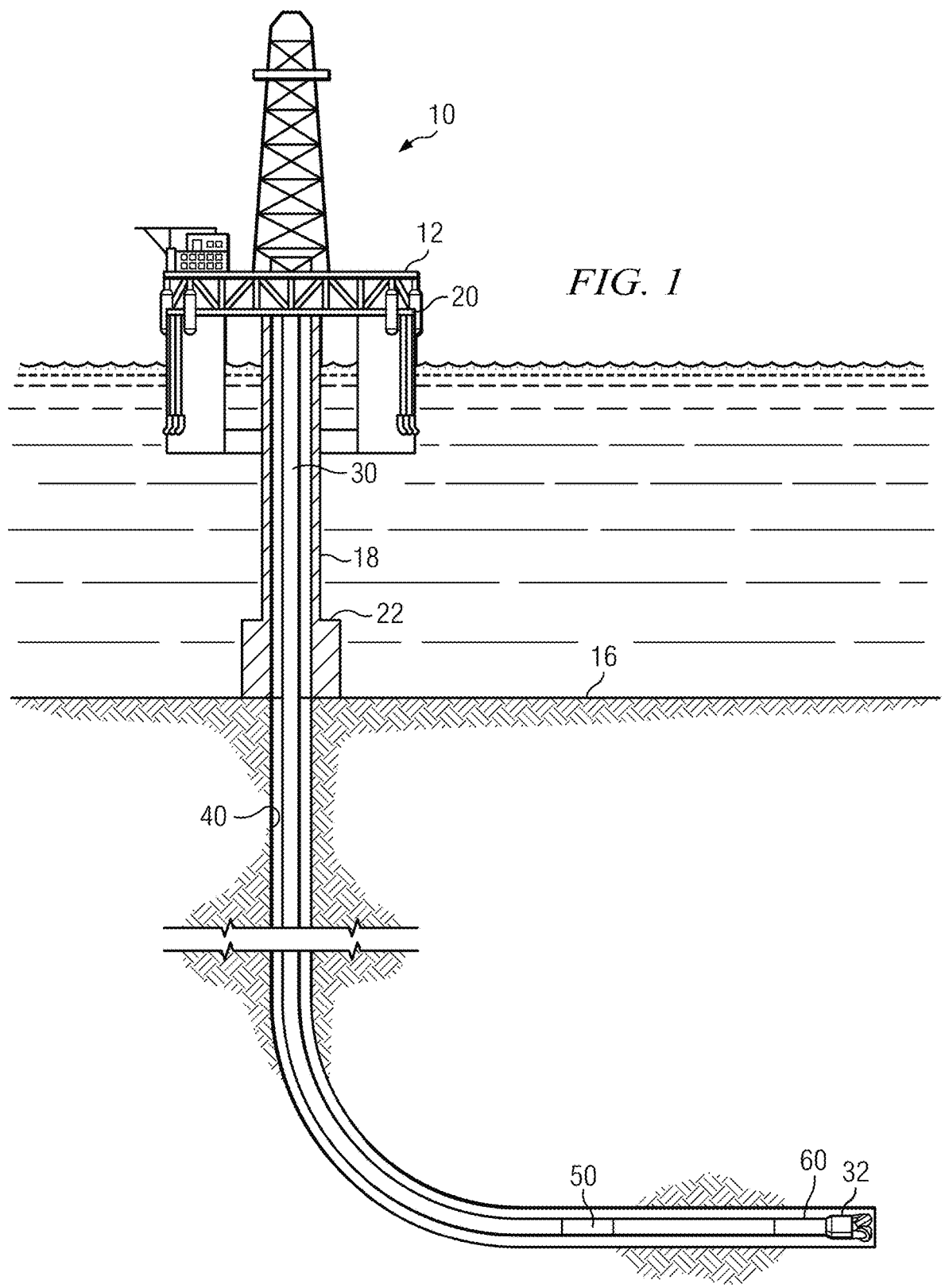
FIG. 1 depicts a drilling rig on which disclosed embodiments may be utilized.

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

Methods for drilling a subterranean wellbore are disclosed. Example methods include rotating a BHA in the subterranean wellbore to drill, in which the BHA includes a drill collar, a drill bit, a roll-stabilized housing deployed in the drill collar and configured to rotate with respect to the drill collar, and a triaxial accelerometer set and a triaxial magnetometer set deployed in the roll-stabilized housing. Triaxial accelerometer and triaxial magnetometer measurements and a drill collar rotation rate measurement are made while the BHA rotates. A wellbore inclination and a gravity tool face of the roll-stabilized housing are computed from the triaxial accelerometer measurements. The computed inclination, the computed gravity toolface, the triaxial magnetometer measurements, and the measured rotation rate of the drill collar are processed to compute an azimuth of the subterranean wellbore, wherein influences of eddy currents and magnetometer biases are accounted for in the computed azimuth. In certain example embodiments, the computed gravity toolface, the triaxial magnetometer measurements, and the measured rotation rate of the drill collar are processed with a Kalman Filter. In other example embodiments, the measured rotation rate of the drill collar is processed to compute an eddy current compensation term. In still other example embodiments, the triaxial magnetometer measurements are processed using multi-station analysis to compute the magnetometer bias.

Example embodiments disclosed herein may provide various technical advantages and improvements over the prior art. For example, an improved method and system for drilling a subterranean wellbore includes making dynamic survey measurements, such as wellbore inclination and wellbore azimuth measurements, in substantially real time while drilling a well (e.g., several measurements per minute or several measurements per foot of measured depth of the wellbore). Moreover, the disclosed embodiments may advantageously compensate (account for) eddy currents in the drill collar and/or roll-stabilized housing and magnetometer bias in the magnetometer measurements and may therefore provide improved accuracy (particularly dynamic azimuth measurements having improved accuracy). The disclosed embodiments may further compute updated eddy current compensation terms and magnetometer bias while drilling and may therefore advantageously account for changes in eddy current and magnetometer bias effects during the drilling operation.

It will be appreciated that the disclosed embodiments may further provide a much higher density of survey measurements along the wellbore profile than are available via conventional static surveying methods, thereby enabling a more accurate wellbore path to be determined. Improving the timeliness and density of wellbore surveys may further advantageously improve the speed and effectiveness of wellbore steering activities, such as wellbore path correction and anti-collision decision making.

FIG. 1 depicts a drilling rig 10 suitable for implementing various method embodiments disclosed herein. A semisubmersible drilling platform 12 is positioned over an oil or gas formation disposed below the sea floor 16. A subsea conduit 18 extends from deck 20 of platform 12 to a wellhead installation 22. The platform may include a derrick and a hoisting apparatus for raising and lowering a drill string 30, which, as shown, extends into wellbore 40 and includes a drill bit 32 and a rotary steerable tool 60. Drill string 30 may further include a downhole drilling motor, a downhole telemetry system, and one or more measurement while drilling (MWD) or logging while drilling (LWD) tools 50 including various sensors for sensing downhole characteristics of the wellbore and the surrounding formation. The disclosed embodiments are not limited in these regards.

It will be understood by those of ordinary skill in the art that the deployment illustrated on FIG. 1 is merely an example. It will be further understood that disclosed embodiments are not limited to use with a semisubmersible platform 12 as illustrated on FIG. 1. The disclosed embodiments are equally well suited for use with any kind of subterranean drilling operation, either offshore or onshore.

Figure 2:
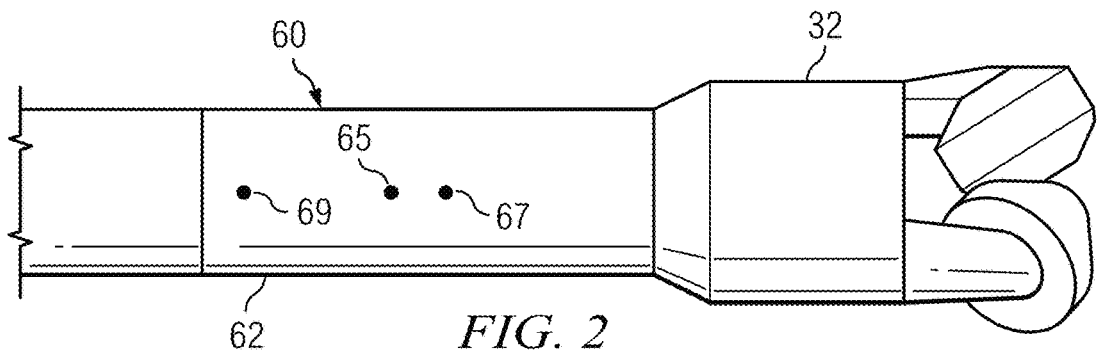
FIG. 2 depicts a lower BHA portion of the drill string shown on FIG. 1.

FIG. 2 depicts the lower BHA portion of drill string 30 (FIG. 1) including drill bit 32 and rotary steerable tool 60. The rotary steerable tool may include substantially any suitable rotary steering tool including a roll-stabilized controller (or control unit) deployed in a roll-stabilized housing or an otherwise substantially non-rotating or geostationary housing. By roll-stabilized it is meant that the sensor housing is substantially non-rotating with respect to the wellbore (or may at times rotate slowly in comparison to the drill string).

While FIG. 2 depicts a rotary steerable tool 60, it will be understood that the disclosed embodiments are not limited to the use of a rotary steerable tool. Moreover, while navigation sensors 65 and 67 (e.g., accelerometers and magnetometers) may be deployed and the corresponding sensor measurements processed in a rotary steerable tool (e.g., as depicted on FIG. 2), they may also be located in a roll-stabilized housing located substantially anywhere in the drill string. For example, with reference again to FIG. 1, drill string 30 may include a measurement while drilling tool 50 including corresponding sensors 65 and 67 deployed in a roll-stabilized housing. As is known to those of ordinary skill in the art, such MWD tools 50 may further include a mud pulse telemetry transmitter or other telemetry system, an alternator for generating electrical power, and an electronic controller. It will thus be appreciated that the disclosed embodiments are not limited to any specific deployment location of the navigational sensors in the drill string.

The example rotary steerable tool 60 and/or MWD tool 50 depicted include(s) tri-axial accelerometer 65 and tri-axial magnetometer 67 navigation sensor sets. These navigation sensors may include substantially any suitable available devices. Suitable accelerometers for use in sensor set 65 may include, for example, conventional Q-flex type accelerometers or micro-electro-mechanical systems (MEMS) solid-state accelerometers. Suitable magnetic field sensors for use in sensor set 67 may include, for example, conventional ring core flux gate magnetometers or magnetoresistive sensors. The navigations sensor may further optionally include gyroscopic sensors such as a rate gyro or a MEMS type gyro.

With continued reference to FIGS. 1 and 2, rotary steerable tool 60 and/or MWD tool 50 may further include a rotation rate sensor 69 configured to measure a difference in rotation rates between the roll-stabilized housing and the drill collar 62 (which is equal to the rotation rate of the collar when the roll-stabilized housing is geostationary). Substantially any suitable rotation rate sensors may be utilized, for example, including a sensor (or sensors) deployed in the roll-stabilized housing and one or more markers (such as magnetic markers) deployed on the collar 62. In example embodiments, the sensor(s) may send an electrical pulse to a controller each time one of the markers rotates by the sensor and the rotation rate may be computed from the time interval between pulses. In one example embodiment, the sensor includes a Hall-effect sensor and the markers may be magnetic markers, although the invention is expressly not limited in this regard.

Figures 3A, 3B:
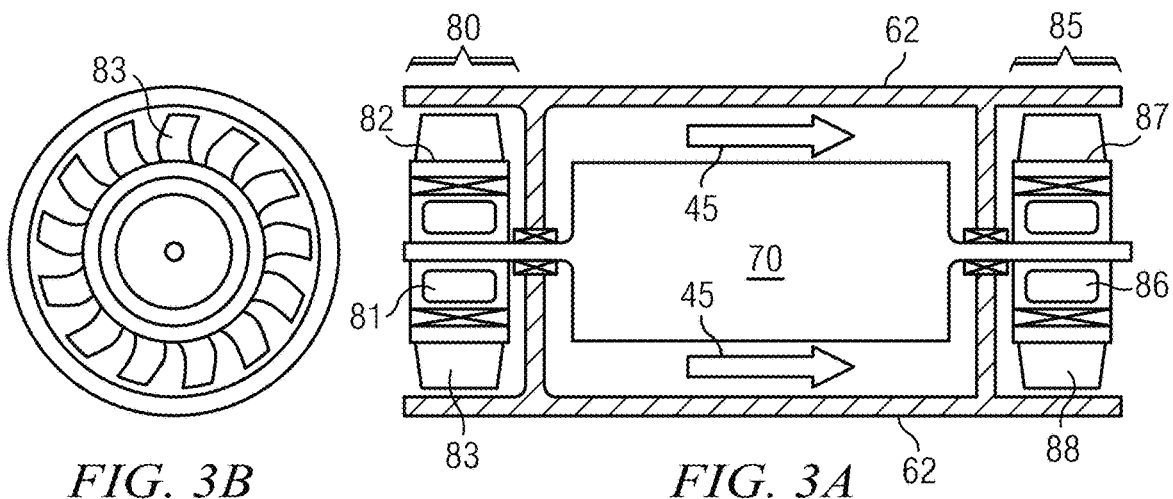
FIGS. 3A and 3B (collectively FIG. 3) depict a schematic representation of a roll-stabilized housing deployed in a downhole tool.

FIGS. 3A and 3B (collectively FIG. 3) depict a schematic representation of one example of a roll-stabilized housing 70 (e.g., a sensor housing) deployed in a rotary steerable tool 60 (FIG. 2). It will be understood that this is merely an example and that the disclosed method embodiments are not limited to any particular roll-stabilizing mechanism or configuration. In the depicted example, the roll-stabilized housing 70 is mounted on bearings such that it is rotationally decoupled from (able to rotate independently with respect to) tool collar 62. In the depicted embodiment, first and second alternators 80, 85 (e.g., of the permanent magnet synchronous motor type) are separately mounted on opposing axial ends of the roll-stabilized housing 70. The corresponding stator windings 81, 86 are mechanically continuous with the roll-stabilized housing 70 (and are therefore rotationally coupled with the roll-stabilized housing). Corresponding rotors including permanent magnets 82, 87 are configured to rotate independently of both the roll-stabilized housing 70 and the tool collar 62. Impeller blades 83, 88 are mechanically contiguous with the corresponding rotors and span the annular clearance between the housing 70 and the tool collar 62 such that they rotate, for example, in opposite directions with the flow of drilling fluid 45 through the tool.

In the depicted example, the rotational orientation of the housing 70 may be controlled by the co-action of the alternators 80 and 85 in combination with feedback provided by the navigation sensors (e.g., accelerometers and/or magnetometers) deployed in the housing. The impellers 83 and 88 being configured to rotate in opposite directions apply corresponding opposite torques to the housing 70. The amount of electrical load on the torque generators 80 and 85 may be changed in response to feedback from the at least one of the sensors 65 and 67 (FIG. 2) to vary the applied torques and thereby control the orientation of the housing. When used in a rotary steerable system, the control unit may have an output shaft that is rigidly connected to a rotary valve. The rotary valve directs fluid from the flow to an actuator in a steering bias unit, which then acts to steer the tool (e.g., by acting on the wellbore wall or by acting on a bit shaft). Thus, by controlling the orientation of the control unit, the orientation of the rotary valve is controlled, thereby providing steering control.

With continued reference to FIGS. 2 and 3, it will be appreciated that rotation of the collar 62 or roll-stabilized housing 70 in the Earth's magnetic field may cause an eddy current (or currents) therein (owing to the Lorentz force created by the Earth's field penetrating the rotating members). These eddy currents may create additional magnetic fields along a radial axis of the BHA and thereby interfere with the magnetic field measurements (made by sensor set 67).

Moreover, the magnitude of the eddy currents and the corresponding interfering magnetic fields may depend on the size and geometry of the drill collar, the rotation rate of the drill collar and/or housing, and the type of drilling fluid utilized in the drilling operation. There is a need for methods to compensate (account) for interfering magnetic fields generated by eddy currents (particularly since these fields can change during the drilling operation).

It will also be appreciated that magnetometer measurements can be biased and that the bias may be dependent on the magnetization of the collar and other tool structures in the vicinity of the sensors. While multi-station analysis (MSA) has been used to remove a constant bias offset, it has been found that the bias offset can change within (during) a drilling operation and that surface data and measurements are generally not sufficient to model the changing bias offset over time and depth while drilling. There is a further need for methods to compensate (account) for offset bias of the magnetometers, particularly offset bias that changes during a drilling operation.

Figure 4:
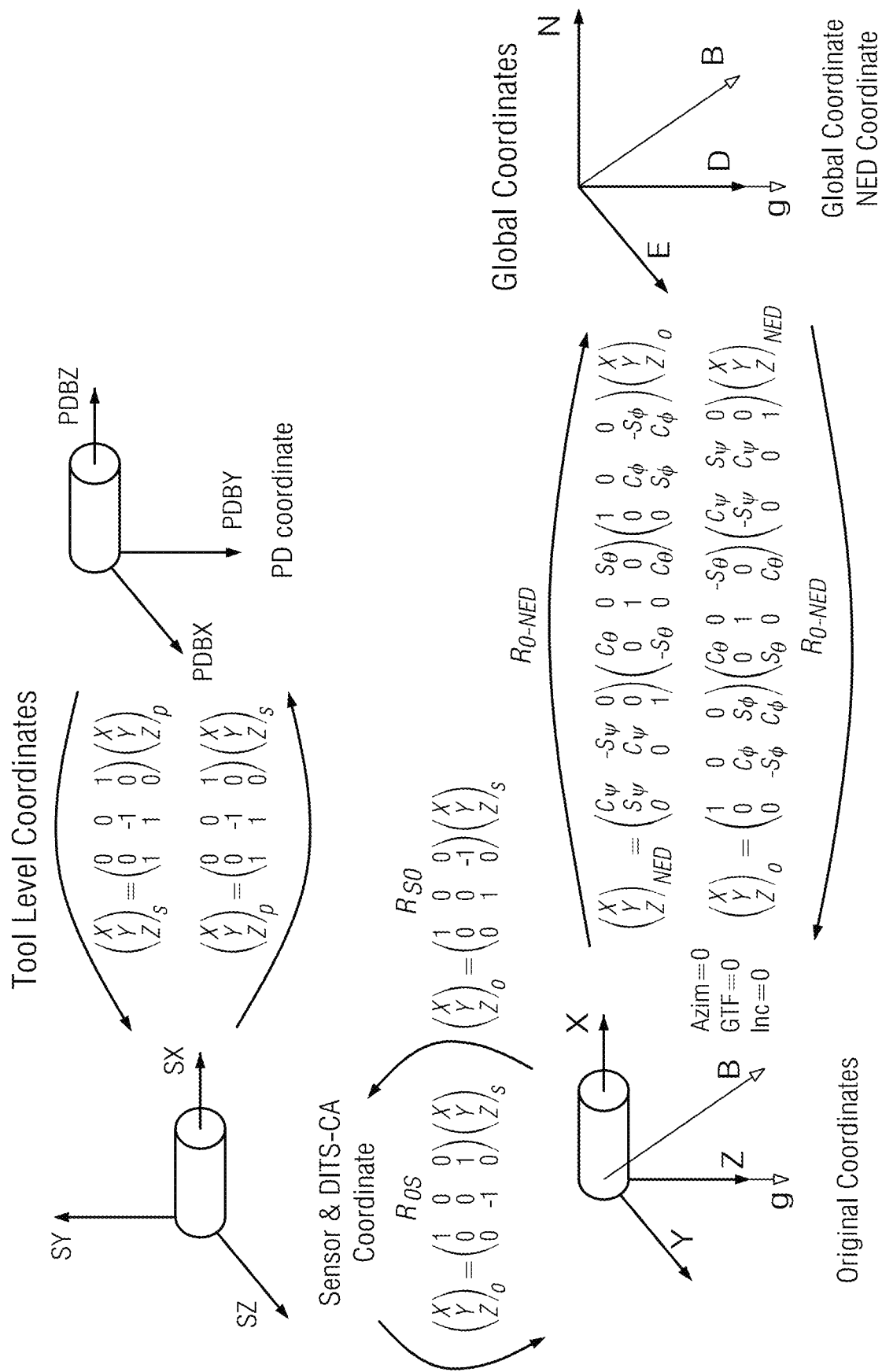
FIG. 4 depicts multiple coordinate systems and their relationship to one another.

FIG. 4 depicts multiple coordinate systems and their relationship to one another. A global north-east-down (NED) coordinate system is commonly used in the industry for simplicity (with north and east referring to north and east directions on the surface of the earth and down referring to a direction pointing directly towards the gravitational center of the earth). Multiple commonly used tool coordinate systems are also shown in FIG. 4, including a PowerDrive (PD) coordinate system, a Sensor (S) coordinate system, and an Original (O) coordinate system. FIG. 4 further shows mathematical transformations that may be used to convert measurements from one coordinate system to another. As used herein, the original O coordinate system is defined to align with the NED coordinate system at zero azimuth, zero toolface, and zero pitch angle (the pitch angle is defined as the inclination minus ninety degrees). The relationship between the NED and original (tool) coordinate systems may be expressed mathematically, for example, as follows:

$$\begin{pmatrix} X \\ Y \\ Z \end{pmatrix}_{NED} =$$

$$R_{NED-O} \begin{pmatrix} X \\ Y \\ Z \end{pmatrix}_O = \begin{pmatrix} C_\psi & -S_\psi & 0 \\ S_\psi & C_\psi & 0 \\ 0 & 0 & 1 \end{pmatrix} \begin{pmatrix} C_\theta & 0 & S_\theta \\ 0 & 1 & 0 \\ -S_\theta & 0 & C_\theta \end{pmatrix} \begin{pmatrix} 1 & 0 & 0 \\ 0 & C_\phi & -S_\phi \\ 0 & S_\phi & C_\phi \end{pmatrix} \begin{pmatrix} X \\ Y \\ Z \end{pmatrix}_O$$

$$\begin{pmatrix} X \\ Y \\ Z \end{pmatrix}_O =$$

$$R_{O-NED} \begin{pmatrix} X \\ Y \\ Z \end{pmatrix}_{NED} = \begin{pmatrix} 1 & 0 & 0 \\ 0 & C_\phi & S_\phi \\ 0 & -S_\phi & C_\phi \end{pmatrix} \begin{pmatrix} C_\theta & 0 & -S_\theta \\ 0 & 1 & 0 \\ S_\theta & 0 & C_\theta \end{pmatrix} \begin{pmatrix} C_\psi & S_\psi & 0 \\ -S_\psi & C_\psi & 0 \\ 0 & 0 & 1 \end{pmatrix} \begin{pmatrix} X \\ Y \\ Z \end{pmatrix}_{NED}$$

where C represents cosine, S represents sine, $\psi$ represents the azimuth, $\phi$ represents the gravity tool face, and $\theta$ represents the pitch angle. For a coordinate system employing inclination (rather than pitch angle), the relationship between the NED and original coordinate systems may be expressed, for example, as follows:

$$\begin{pmatrix} X \\ Y \\ Z \end{pmatrix}_{NED} =$$

$$R_{NED-O} \begin{pmatrix} X \\ Y \\ Z \end{pmatrix}_O = \begin{pmatrix} C_\psi & -S_\psi & 0 \\ S_\psi & C_\psi & 0 \\ 0 & 0 & 1 \end{pmatrix} \begin{pmatrix} S_I & 0 & -C_I \\ 0 & 1 & 0 \\ C_I & 0 & S_I \end{pmatrix} \begin{pmatrix} 1 & 0 & 0 \\ 0 & C_\phi & -S_\phi \\ 0 & S_\phi & C_\phi \end{pmatrix} \begin{pmatrix} X \\ Y \\ Z \end{pmatrix}_O$$

$$\begin{pmatrix} X \\ Y \\ Z \end{pmatrix}_O =$$

$$R_{O-NED} \begin{pmatrix} X \\ Y \\ Z \end{pmatrix}_{NED} = \begin{pmatrix} 1 & 0 & 0 \\ 0 & C_\phi & S_\phi \\ 0 & -S_\phi & C_\phi \end{pmatrix} \begin{pmatrix} S_I & 0 & -C_I \\ 0 & 1 & 0 \\ C_I & 0 & S_I \end{pmatrix} \begin{pmatrix} C_\psi & S_\psi & 0 \\ -S_\psi & C_\psi & 0 \\ 0 & 0 & 1 \end{pmatrix} \begin{pmatrix} X \\ Y \\ Z \end{pmatrix}_{NED}$$

With further reference to FIGS. 2-4, one aspect of the disclosed embodiments was the realization that triaxial magnetometer measurements may be modelled, for example, as follows:

$$\begin{pmatrix} B_x \\ B_y \\ B_z \end{pmatrix}_i = \begin{pmatrix} 1 & 0 & 0 \\ 0 & 1 & -\gamma_s \omega_s \\ 0 & \gamma_s \omega_s & 1 \end{pmatrix} \begin{pmatrix} 1 & 0 & 0 \\ 0 & 1 & -\gamma_c \omega_c \\ 0 & \gamma_c \omega_c & 1 \end{pmatrix} \begin{pmatrix} \hat{B}_x \\ \hat{B}_y \\ \hat{B}_z \end{pmatrix} + \begin{pmatrix} b_x \\ b_y \\ b_z \end{pmatrix} + \begin{pmatrix} \varepsilon_{B_x} \\ \varepsilon_{B_y} \\ \varepsilon_{B_z} \end{pmatrix}$$

where $B_x$, $B_y$, and $B_z$ represent the triaxial magnetometer measurements in the original coordinate system at survey station (survey location) i, $\hat{B}_x$, $\hat{B}_y$, and $\hat{B}_z$ represent the true magnetic field vector (or true magnetic field measurements representative of reality), $b_x$, $b_y$, and $b_z$ represent the magnetometer bias, $\gamma_c$ and $\gamma_s$ represent eddy current compensation terms for drill collar rotation $\gamma_c$ and roll-stabilized sensor housing rotation $\gamma_s$, $\omega_c$ and $\omega_s$ represent the rotation rates (angular frequency) of the drill collar and sensor housing, and $\varepsilon B_x$, $\varepsilon B_y$, and $\varepsilon B_z$ represent error terms.

It will be appreciated in certain operations, or at various times within an operation, that the sensor housing rotation rate may be zero or near zero such that the above equation reduces to the following:

$$\begin{pmatrix} B_x \\ B_y \\ B_z \end{pmatrix}_i = \begin{pmatrix} 1 & 0 & 0 \\ 0 & 1 & -\gamma_c\omega_c \\ 0 & \gamma_c\omega_c & 1 \end{pmatrix} \begin{pmatrix} \hat{B}_x \\ \hat{B}_y \\ \hat{B}_z \end{pmatrix} + \begin{pmatrix} b_x \\ b_y \\ b_z \end{pmatrix} + \begin{pmatrix} \varepsilon_{B_x} \\ \varepsilon_{B_y} \\ \varepsilon_{B_z} \end{pmatrix}$$

In the NED coordinate system, the gravity and magnetic fields may be defined as follows:

$$\begin{pmatrix} \hat{G}_N \\ \hat{G}_E \\ \hat{G}_n \end{pmatrix}_{NED} = \begin{pmatrix} 0 \\ 0 \\ G \end{pmatrix}$$

$$\begin{pmatrix} \hat{B}_N \\ \hat{B}_E \\ \hat{B}_Z \end{pmatrix}_{NED} = \begin{pmatrix} B \cos(D) \\ 0 \\ B \sin(D) \end{pmatrix}$$

where G represents the total gravitational field at the location, B represents the total magnetic flux at the location, and D represents the dip angle of the magnetic flux at the location. Assuming that the true azimuth, inclination, and toolface are known, the true gravity vector and magnetic field vector in the original coordinate system (e.g., at the tool) may be expressed as follows:

$$\begin{pmatrix} \hat{G}_x \\ \hat{G}_y \\ \hat{G}_z \end{pmatrix}_O = R_{O-NED} \begin{pmatrix} 0 \\ 0 \\ G \end{pmatrix} = \begin{pmatrix} G \cos I \\ G \sin I \sin \phi \\ G \sin I \cos \phi \end{pmatrix}$$

$$\begin{pmatrix} \hat{B}_x \\ \hat{B}_y \\ \hat{B}_z \end{pmatrix}_O = R_{O-NED} \begin{pmatrix} B \cos(D) \\ 0 \\ B \sin(D) \end{pmatrix} =$$

$$B \begin{pmatrix} +\cos I \sin D + \cos \psi \cos D \sin I \\ \sin D \sin I \sin \phi - \cos D(\cos \phi \sin \psi + \cos \psi \cos I \sin \phi) \\ \cos D (\sin \psi \sin \phi - \cos \psi \cos I \cos \phi) + \cos \phi \sin D \sin I \end{pmatrix}$$

The magnetometer bias may be thought of as a semi-constant parameter. For example, at the survey station i, if the true magnetic field is $(\sqrt{B_x}, \sqrt{B_y}, \sqrt{B_z})^T$ the bias offset may be expressed as follows:

$$\begin{pmatrix} B_x \\ B_y \\ B_z \end{pmatrix}_i = \begin{pmatrix} \hat{B}_x \\ \hat{B}_y \\ \hat{B}_z \end{pmatrix} + \begin{pmatrix} b_x \\ b_y \\ b_z \end{pmatrix}$$

Figure 5:
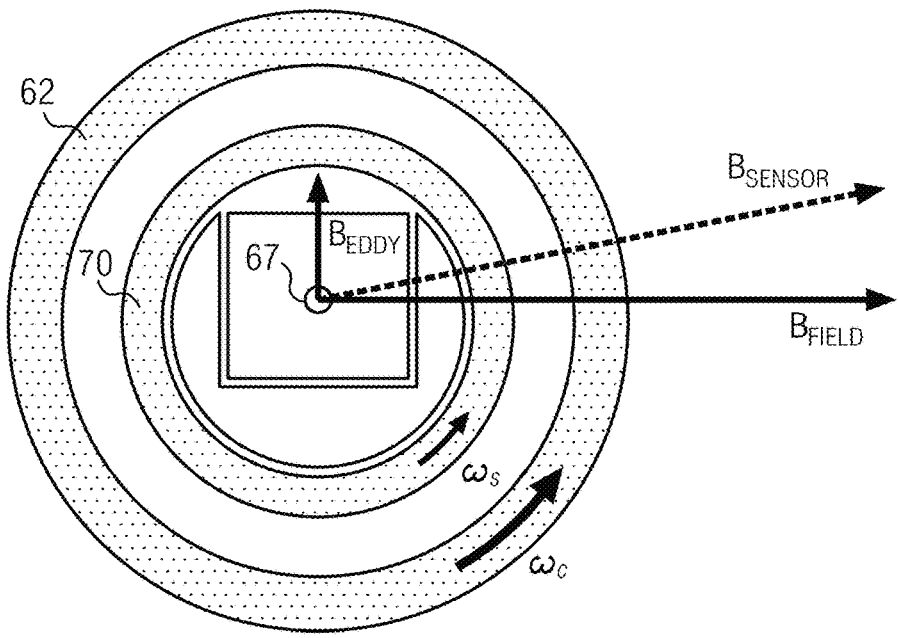
FIG. 5 depicts a cross section of an example rotary steerable tool including schematic magnetic field vectors.

Turning now to FIG. 5, as described above, an interfering magnetic field may result, for example, from an eddy current (or eddy currents) in the rotating drill collar and/or sensor housing. Rotation of the collar 62 and/or housing 70 in the Earth's magnetic field $B_{field}$ may generate an eddy current in the collar 62 and/or housing 70 (owing to the Lorentz force created by the Earth's field penetrating rotating collar and/or housing). The interfering field $B_{eddy}$ is directed in the radial direction as shown such that the measured field $B_{sensor}$ may deviate from the external field $B_{field}$. In this disclosure it is assumed that the amplitude of $B_{eddy}$ (the magnetic field induced by eddy current) is proportional to the strength of the external magnetic field $B_{field}$, the rotational speed of the collar $\omega_c$ and/or the sensor housing $\omega_s$, and the eddy current coefficients $\gamma_c$ and $\gamma_s$. It is further assumed that the induced magnetic field $B_{eddy}$ is orthogonal to the external magnetic field owing to the symmetry of the collar and sensor housing.

Based on the foregoing assumptions the induced magnetic fields from eddy currents in the drill collar and sensor housing may be expressed, for example, as follows:

$$\begin{pmatrix} B_x \\ B_y \\ B_z \end{pmatrix}_i = \begin{pmatrix} 1 & 0 & 0 \\ 0 & 1 & -\gamma_s\omega_s \\ 0 & \gamma_s\omega_s & 1 \end{pmatrix} \begin{pmatrix} 1 & 0 & 0 \\ 0 & 1 & -\gamma_c\omega_c \\ 0 & \gamma_c\omega_c & 1 \end{pmatrix} \begin{pmatrix} \hat{B}_x \\ \hat{B}_y \\ \hat{B}_z \end{pmatrix}$$

In operations in which (or at times at which) the sensor housing is essentially geostationary (non-rotating), the preceding equation may be simplified as follows:

$$\begin{pmatrix} B_x \\ B_y \\ B_z \end{pmatrix}_i = \begin{pmatrix} \hat{B}_x \\ \hat{B}_y \\ \hat{B}_z \end{pmatrix} + \gamma_c\omega_c \begin{pmatrix} 0 \\ -\hat{B}_z \\ \hat{B}_y \end{pmatrix} = \begin{pmatrix} 1 & 0 & 0 \\ 0 & 1 & -\gamma_c\omega_c \\ 0 & \gamma_c\omega_c & 1 \end{pmatrix} \begin{pmatrix} \hat{B}_x \\ \hat{B}_y \\ \hat{B}_z \end{pmatrix}$$

As shown above, the eddy current effect may be approximated as a rotation of a misalignment matrix around the tool axis (the x-axis in the original coordinate system). An accurate estimate of the eddy current compensation terms $\gamma_c$ and $\gamma_s$ is needed to accurately compensate (correct) the magnetic field measurements for eddy current effects.

Figure 6A:
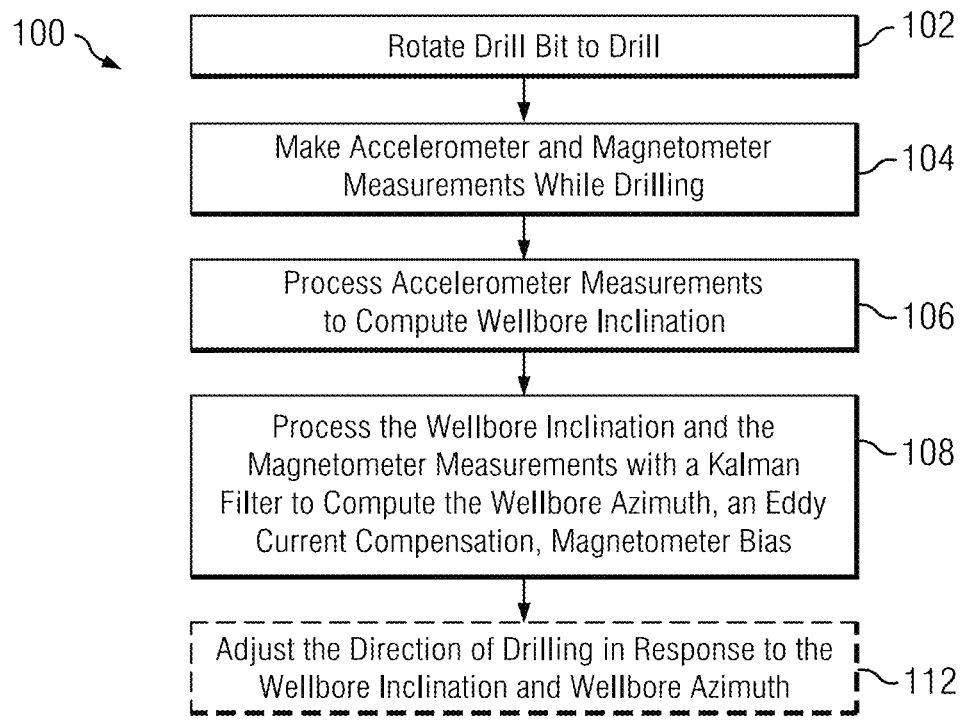
FIGS. 6A and 6B (collectively FIG. 6) depict flow charts of example methods for drilling a subterranean wellbore.
Figure 6B:
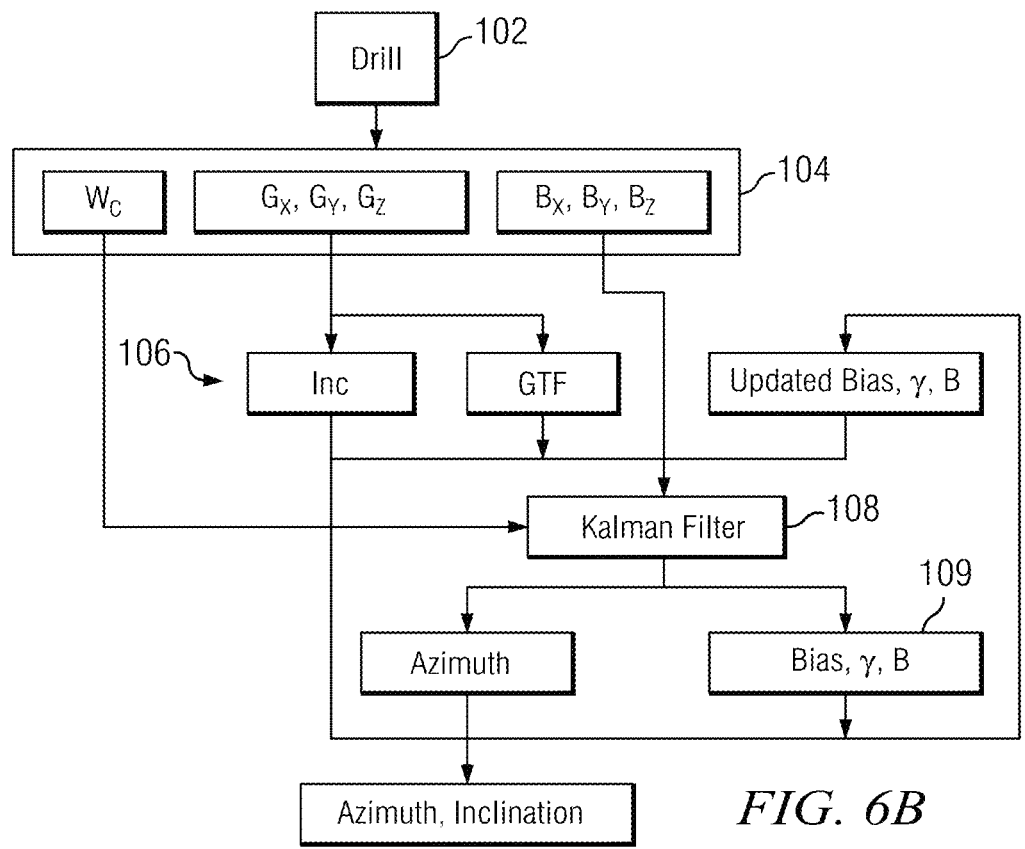

FIGS. 6A and 6B (collectively FIG. 6) depict example methods 100 and 100' for drilling a subterranean wellbore. The methods 100 and 100' may include deploying a drill string, including a BHA, in the wellbore, e.g., as shown on FIG. 1. The BHA may include a rotary steerable drilling tool including a drill collar and a roll-stabilized sensor housing, e.g., as shown on FIGS. 2 and 3. The BHA is rotated in the wellbore at 102, for example, to drill. Triaxial magnetic field measurements and triaxial accelerometer measurements (gravitational field measurements) are made using corresponding sensors located in a roll-stabilized housing at 104. Rotation rates of the drill collar and/or the sensor housing may also be measured at 104. The triaxial accelerometer measurements may be evaluated at 106 to compute wellbore inclination I, total gravity G, and the gravity tool face GTF of the sensor housing. The wellbore inclination, gravity tool face, the magnetic field measurements, and the latest bias offset, eddy current compensation, and total magnetic field may be processed with a Kalman filter at 108 to compute the wellbore azimuth $\psi$, the derivative of the wellbore azimuth with respect to time $\dot{\psi}$, an updated magnetometer bias, total gravity, and eddy current compensation values as indicated at 109. The wellbore inclination and wellbore azimuth may be optionally used for wellbore position and trajectory control at 112 while drilling continues in 102. For example, the direction of drilling in 102 may be adjusted in response to the inclination and azimuth (e.g., by adjusting the positions of blades or other actuating components in a rotary steerable tool) to continue drilling along a predetermined path or some other desired path.

With continued reference to FIG. 6, an example state model may be defined, for example, as follows:

$$B_{k+1} = G\beta_k + \omega$$

In one example:

$$\beta_{k+1} = \begin{pmatrix} \psi \\ \dot{\psi} \\ \gamma \\ B \\ b_x \\ b_y \\ b_z \end{pmatrix}_{k+1}$$

where $\omega$ represents the wellbore azimuth, $\dot{\omega}$ represents the derivative of the wellbore azimuth with respect to time, $\gamma$ represents the eddy current compensation term for the drill collar or the sensor housing, B represents the total magnetic field, and $b_x$, $b_y$, and $b_z$ represent the magnetometer bias.

A measurement model may be defined, for example, as follows:

$$B_i = \begin{pmatrix} B_x \\ B_y \\ B_z \end{pmatrix}_i = H(\psi, \gamma, B, b_x, b_y, b_z, I, D, \phi) + \begin{pmatrix} \varepsilon_{B_x} \\ \varepsilon_{B_y} \\ \varepsilon_{B_z} \end{pmatrix}$$

where H represents the observation model function. The extended Kalman filter may be configured to solve the problem and compute $\omega$, $\dot{\omega}$, $\gamma$, B, $b_x$, $b_y$, and $b_z$ at 108. For this example, the system prediction step may be expressed as follows:

$$\sqrt{B}_{k+1} = G\beta_k$$

$$\sqrt{C}_{k+1} = GC_k G^T + R$$

The Kalman gain calculation may be given as follows:

$$K_{k+1} = \sqrt{C}_{k+1} J^T (J\sqrt{C}_{k+1} J^T + Q)^T$$

The state vector and covariance matrix may be updated with the measurements as follows:

$$\beta_{k+1} = \sqrt{\beta}_{k+1} + K_{k+1}(z - H)$$

$$C_{k+1} = (E - K_{k+1} H)\sqrt{C}_{k+1}$$

where $\beta$ is the state vector which includes $(\omega, \dot{\omega}, \gamma, B, b_x, b_y,$ and $b_z)^T$, G is the system matrix (and is not to be confused with the total gravity), R is the covariance matrix for system uncertainty, Q is the measurement noise covariance matrix, and J is the Jacobian matrix which is the differential of H with respect to $\beta$. The contents of the Jacobian matrix may be obtained, for example, using the symbolic math toolbox of MATLAB.

Figure 7A:
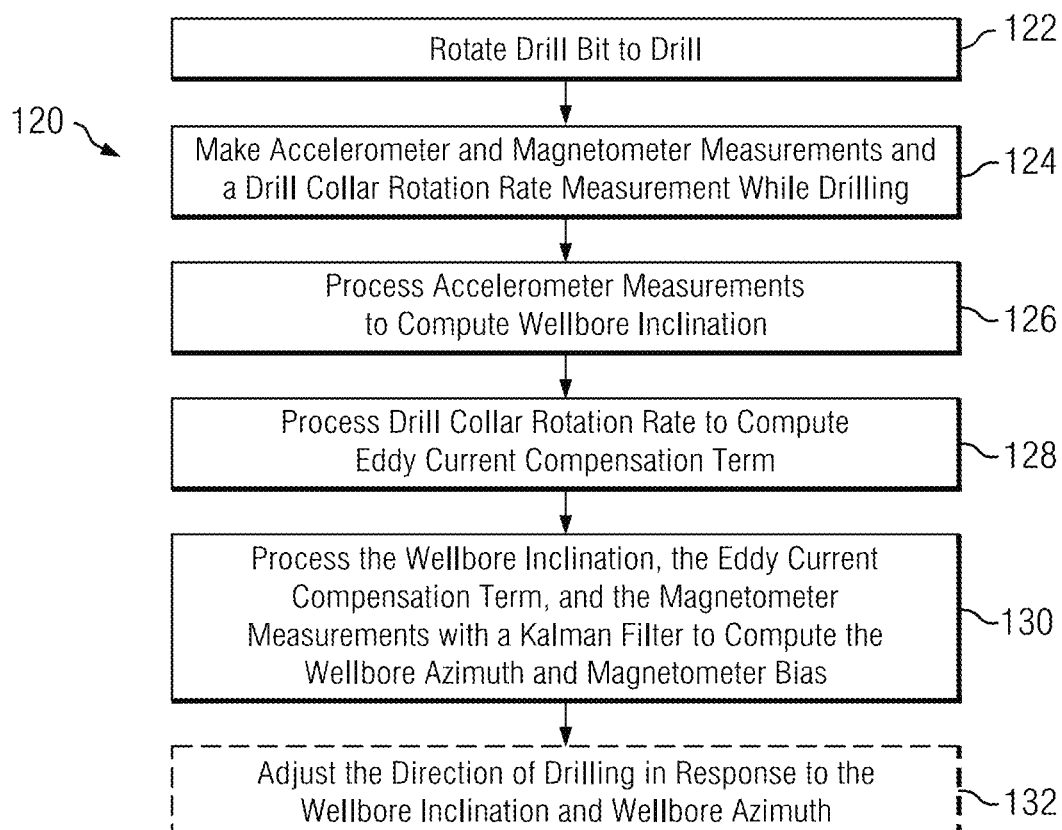
FIGS. 7A and 7B (collectively FIG. 7) depict flow charts of other example methods for drilling a subterranean wellbore.
Figure 7B:
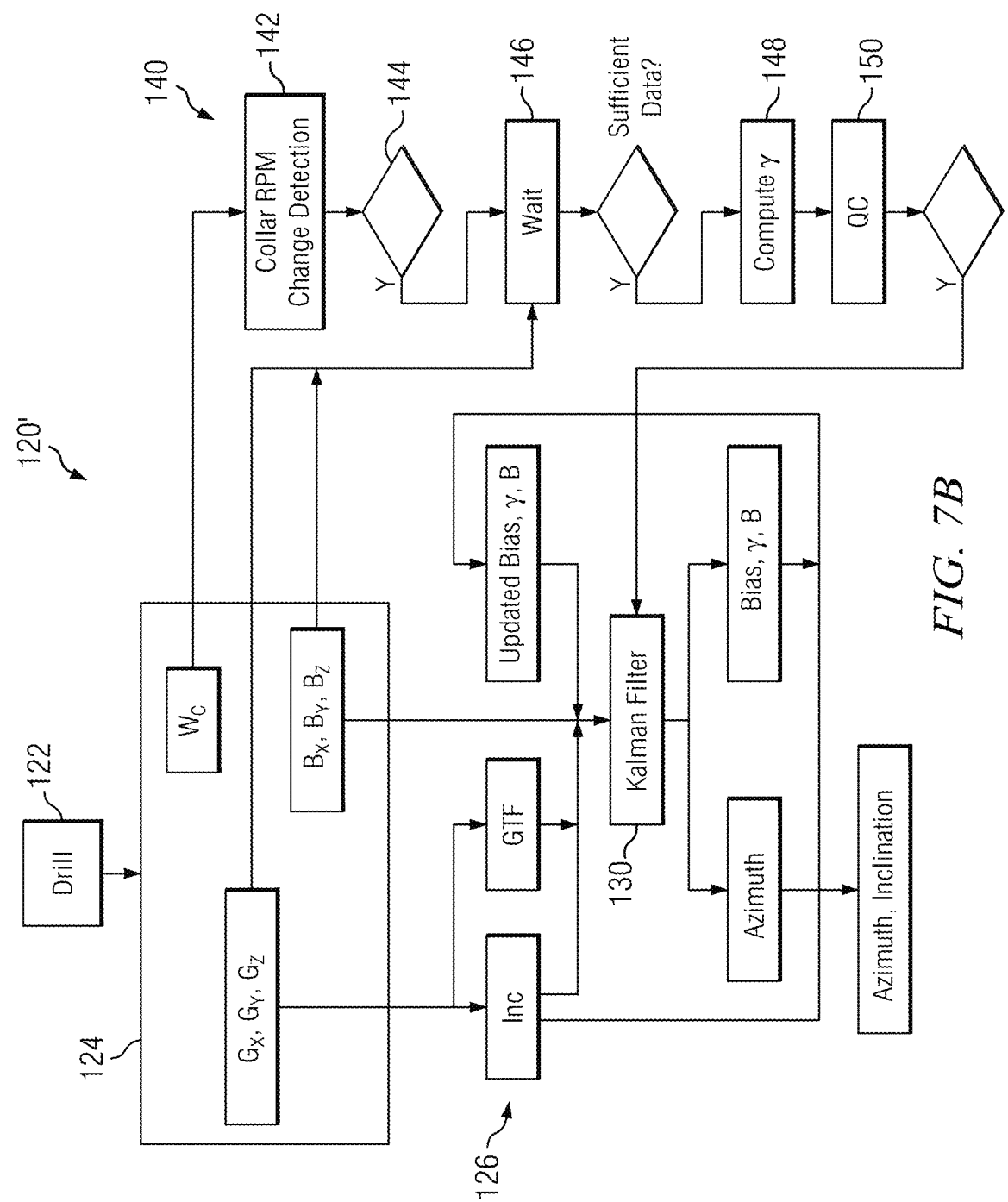

FIGS. 7A and 7B (collectively FIG. 7) depict flow charts of example methods 120 and 120' for drilling a subterranean wellbore. These methods may include deploying a BHA in a wellbore in which the BHA includes a rotary steerable drilling tool having a roll-stabilized sensor housing as described above with respect to FIG. 6 (and FIGS. 2 and 3). The BHA is rotated in the wellbore at 122, for example, to drill. Triaxial magnetic field measurements and triaxial accelerometer measurements (gravitational field measurements) are made using corresponding sensors located in the roll-stabilized housing at 124. Rotation rates of the drill collar may also be measured at 124. The triaxial accelerometer measurements may be evaluated at 126 to compute wellbore inclination I, total gravity G, and the gravity tool face GTF of the sensor housing.

In FIG. 7A, an eddy current compensation term $\gamma$ may be computed from the measured collar rotation rate (or a change in the collar rotation rate) at 128 as also shown at 140 on FIG. 7B. The wellbore inclination, gravity tool face, the magnetic field measurements, and the latest magnetometer bias, eddy current compensation term, and total magnetic field may then be processed with a Kalman filter at 130 to compute the wellbore azimuth $\omega$, the derivative of the wellbore azimuth with respect to time $\dot{\omega}$, and updated magnetometer bias and total gravity. The wellbore inclination and wellbore azimuth may be optionally used for wellbore position and trajectory control at 132 while drilling continues in 122. For example, the direction of drilling in 122 may be adjusted in response to the inclination and azimuth (e.g., by adjusting the positions of blades or other actuating components in a rotary steerable tool) to continue drilling along a predetermined path.

It will be appreciated that methods 120 and 120' are similar to methods 100 and 100' in that they utilize a Kalman filter to estimate the wellbore azimuth, but differ therefrom in that the eddy current compensation term $\gamma$ is updated independently from the Kalman filter, for example, when a significant change in collar (or sensor housing) rotation has been detected. An example state model for the Kalman filter 130 of method 120 and 120' may be given as follows (note that the example model will not include the eddy current compensation term $\gamma$):

$$\beta_{k+1} = G\beta_{k+\omega}$$

In one example:

$$\beta_{k+1} = \begin{pmatrix} \psi \\ \dot{\psi} \\ B \\ b_x \\ b_y \\ b_z \end{pmatrix}_{k+1}$$

The measurement model may be defined, for example, as given above where $\gamma$ is obtained using the separate algorithm. The contents of example Jacobian matrix of H may be obtained as also described above.

The eddy current compensation term $\gamma$ may be estimated, for example, from a change in angle X when the rotation rate changes. It will be appreciated that angle X is the angle between the gravity and magnetic field vectors in the y-z plane (the cross axial plane perpendicular to the axis of the BHA) and may be computed, for example, as follows:

$$X = \mathrm{acos}\left(\frac{B_y G_y + B_z G_z}{|B_{yz}||G_{yz}|}\right)$$

where $|B_{yz}|$ and $|G_{yz}|$ represent the magnitudes of the cross-axial (the yz) components of the magnetic field measurements and the accelerometer measurements. In the absence of eddy currents, angle X is essentially constant. However, angle X has been found to change with changing collar rotation rate (e.g., increase with increasing rotation rate). This dependency on the collar rotation rate may be used to estimate the eddy current compensation term $\gamma$ (and to estimate changes in the eddy current compensation term with a changing rotation rate of the collar). An example error model for angle X is given below:

$$\mathrm{var}(dX) = \frac{\sigma_B^2}{B^2\left(1 - (\cos\psi\cos D\sin I + \sin D\cos I)^2\right)} + \frac{\sigma_G^2}{G^2 \sin^2 I}$$

where σ(dB) and σ(dG) are standard deviations of the noise level of the magnetometer ($\varepsilon_{B_x}$) and accelerometer ($\varepsilon_{G_x}$) readings (including environmental noise). There are geometric conditions in which high errors can be observed. In general, high errors are observed when the tool axis is parallel to the reference magnetic or gravity field. More generally, it can be noisier when the wellbore is heading to the north in the northern hemisphere, heading to the south in the southern hemisphere, and the tool is vertical.

Figure 8:
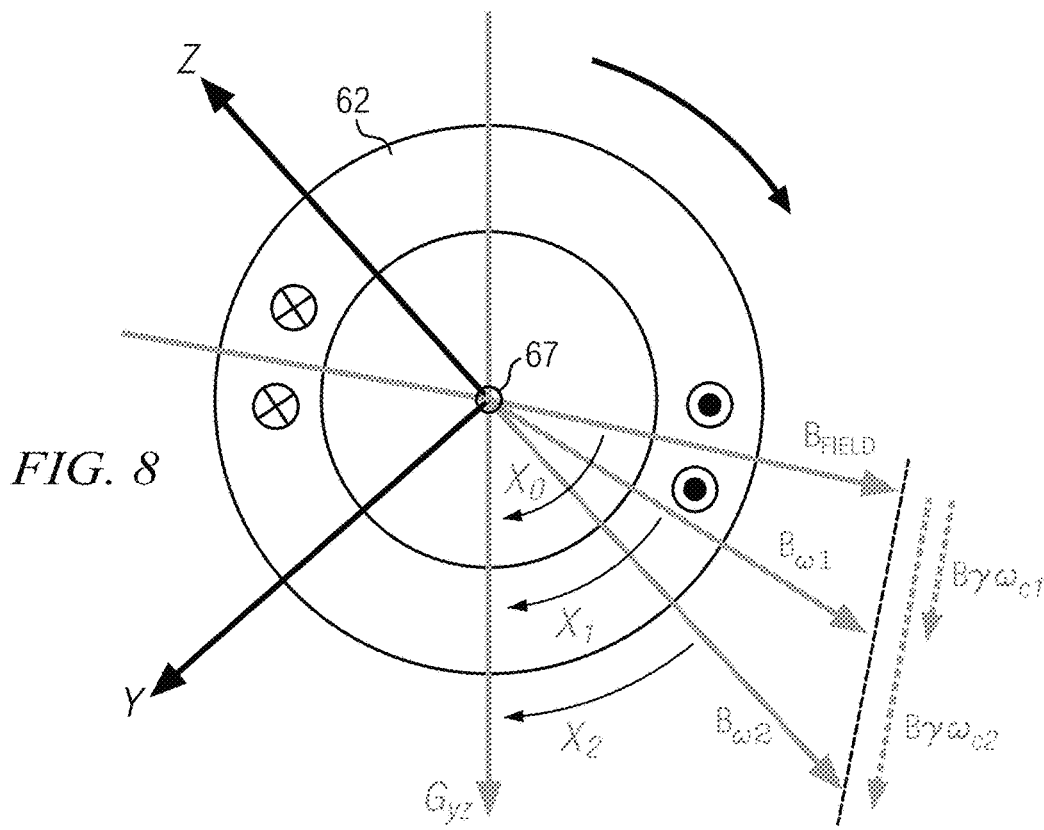
FIG. 8 depicts a cross section of an example drill collar including schematic magnetic field vectors.

FIG. 8 schematically depicts a cross section of an example drill collar 62 and indicates one example method for estimating the eddy current compensation term γ from the relationship between angle X and the collar (or sensor housing) rotation rate (the sensor housing is not shown for simplicity of illustration). The cross axial magnetic field $B_{field}$ and the cross axial gravitational field $G_{yz}$ are indicated. As described above, angle X is the angle between these two vectors in the cross-axial plane. In this depiction, angle X is assumed to be $X_0$ when the collar rotation rate is zero, $X_1$ when the collar rotation rate is $\omega_1$, $X_2$ when the collar rotation rate is $\omega_2$, and so on. Based on the depiction in FIG. 8, angle X may be expressed in terms of the collar (and/or sensor housing) rotation rate, for example, as follows:

$$X_\omega = X_0 + \operatorname{atan} \gamma\omega$$

Taking the derivative of angle X with respect to ω and solving for γ yields the following:

$$\frac{\partial X_\omega}{\partial \omega} = \frac{\gamma}{\gamma^2 \omega^2 + 1} = \frac{1}{\alpha}$$

$$\gamma = \alpha \frac{1 - \sqrt{1 - 4\frac{\omega^2}{\alpha^2}}}{2\omega^2}$$

While the preceding equation provides a suitable solution for the eddy current compensation term γ, a simplified solution may be obtained by recognizing that the eddy current compensation term may be approximated as follows when $\omega^2 \gg \alpha^2$ (e.g., when $\omega^2/\alpha^2$ approaches zero):

$$\gamma \approx \alpha \frac{1 - \left(1 - 2\frac{\omega^2}{\alpha^2}\right)}{2\omega^2} = \frac{1}{\alpha} = \frac{\partial X_\omega}{\partial \omega}$$

This approximation provides for more robust computation of γ and advantageously has an error of less than 1 percent for most drilling conditions (e.g., collar rotation rates of less than about 300 rpm).

With reference again to FIG. 7B, an updated eddy current compensation term γ may be computed at 140, for example, as follows. A change in the collar (or sensor housing) rotation rate may be detected at 142. For example, a moving average may be applied to the collar rotation rate measurements at 142 (e.g., a moving average over 25 or 50 measurements). The range (max–min) of the averaged rotation rates may be computed over predetermined time intervals at (e.g., in overlapping 2 minute windows) and compared with a threshold at 144 (e.g., 50, 100, or 150 rpm). When the range is greater than the threshold, additional data is collected at 146 and an updated eddy current compensation term γ is computed at 148, for example via computing a linear regression with the rotation rate and angle X. The updated eddy current compensation term γ may be optionally checked at 150, for example, via evaluating the standard error oy, the fitting error $e_X$, and/or a difference from a reference obtained from a prior data set $|\gamma - \gamma_{ref}|$. When the quality control parameter(s) are within predetermined criteria, the updated eddy current compensation term γ may be input into the Kalman filter at 128. It will be appreciated that the updated eddy current compensation term γ may be computed, for example, by averaging the new estimate with the previous estimate (or a fraction of the previous estimate) to reduce noise.

Figure 9A:
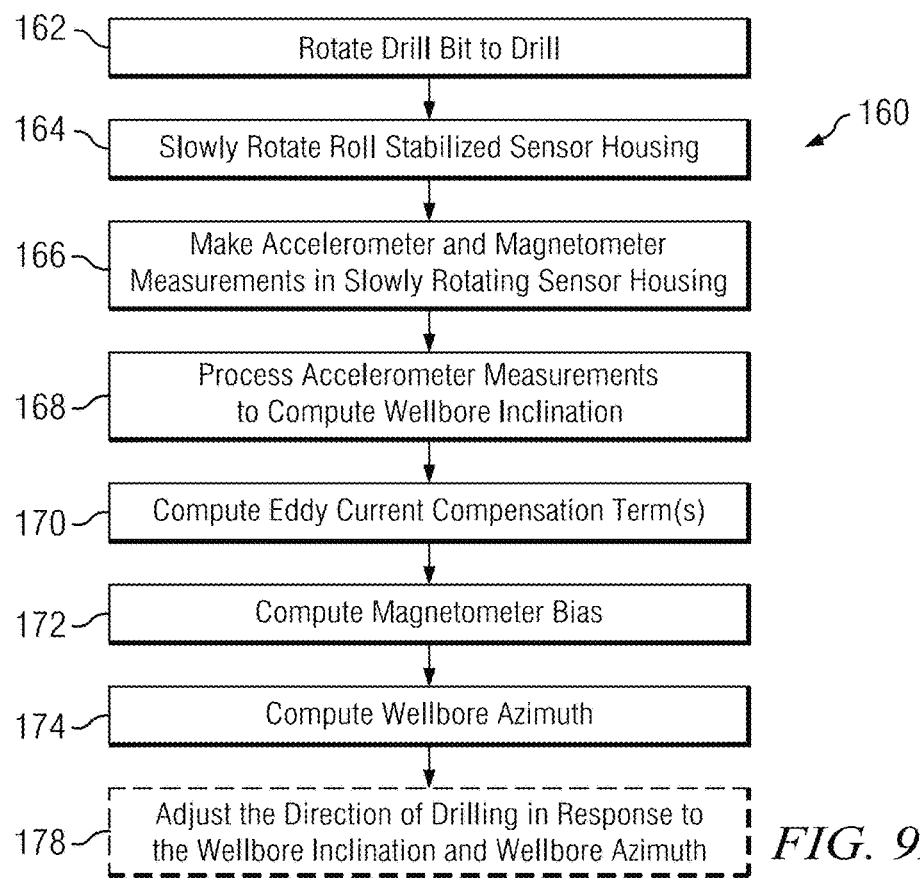
FIGS. 9A and 9B (collectively FIG. 9) depict flow charts of still other example methods for drilling a subterranean wellbore.
Figure 9B:
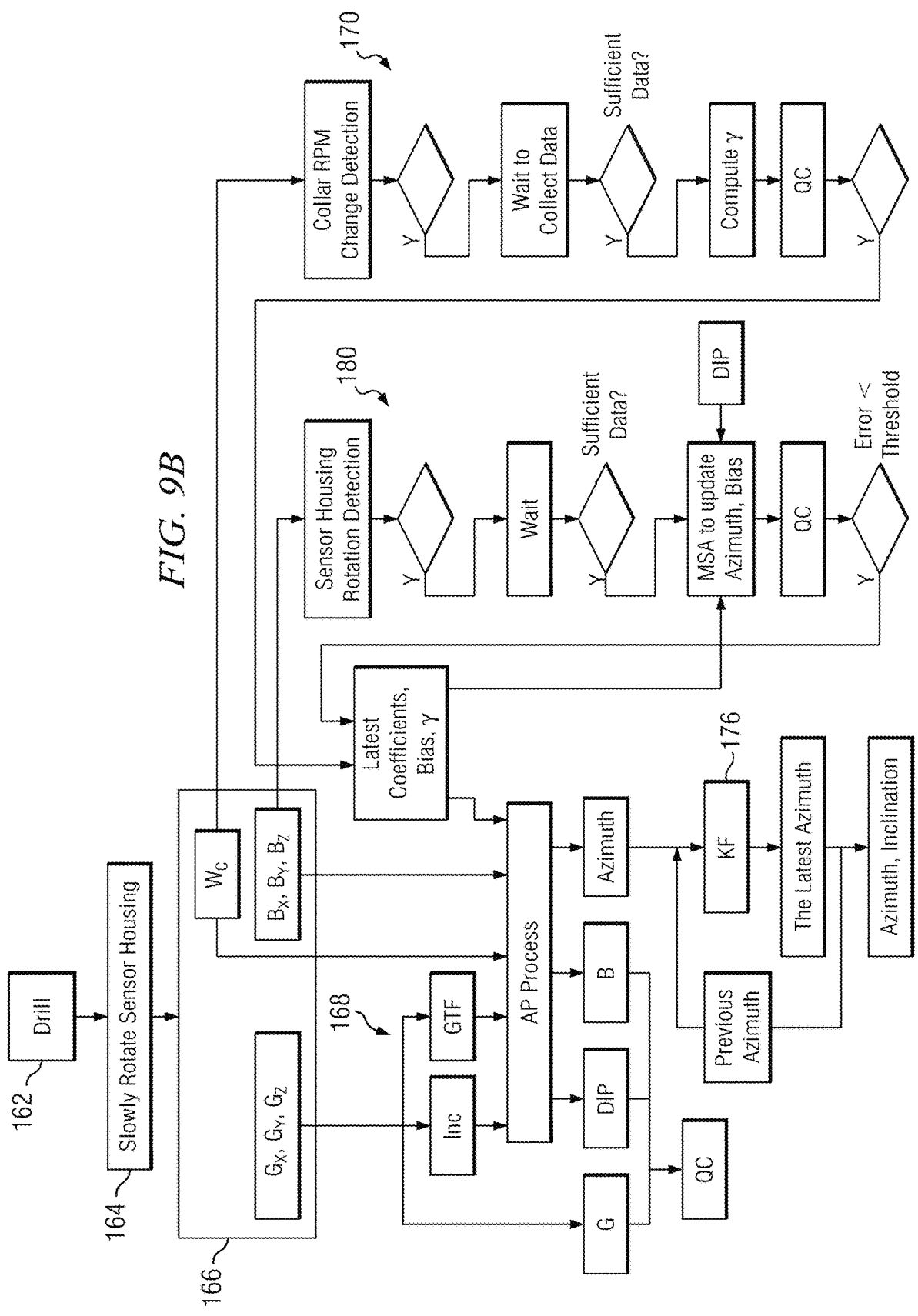

Turning now to FIGS. 9A and 9B (collectively FIG. 9), flow charts of still other example methods 160 and 160' for drilling a subterranean wellbore are depicted. Methods 160 and 160' are similar to methods 100, 100', 120, and 120' in that they include deploying a BHA in a wellbore in which the BHA includes a rotary steerable drilling tool having a roll-stabilized sensor housing as described above. The BHA is rotated in the wellbore at 162, for example, to drill. The roll-stabilized sensor housing is slowly rotated with respect to the wellbore at 164. By slowly rotated it is meant that the sensor housing rotation rate is much less than the drill collar and/or BHA rotation rate. For example, the sensor housing rotation rate may be less than about 10 rpm. In one example embodiment described in more detail below by way of example, the sensor housing rotation rate is 4 rpm. In example embodiments, the roll-stabilized sensor housing may be geostationary during certain time intervals and slowly rotating during other time intervals. For example, at predetermined time or depth intervals the roll-stabilized sensor housing may slowly rotate for a predetermined time (e.g., 1 or 2 minutes) or a predetermined number of rotations (e.g., 2, 4, or 6 full rotations).

Triaxial magnetic field measurements and triaxial accelerometer measurements (gravitational field measurements) are made while the sensor housing is slowly rotating using the corresponding sensors located in the roll-stabilized housing at 166. Rotation rates of the drill collar and/or the sensor housing may also be measured at 166. The triaxial accelerometer measurements may be evaluated at 168 to compute wellbore inclination I, total gravity G, and/or the gravity tool face GTF of the sensor housing.

Methods 160 and 160' are similar to methods 120 and 120' in that they further include computing an eddy current compensation term γ (or terms) from the rotation rates (or change in rotation rates) of the drill collar and/or the sensor housing at 170. For example, methods 160 and 160' may include computing first and second eddy current compensation terms $\gamma_c$ and $\gamma_s$ from the rotation rates of the drill collar and the sensor housing. It will be appreciated that in certain tool embodiments, the sensor housing may be fabricated from a highly conductive aluminum alloy and that the eddy current effect can be significant even though the sensor housing rotates slowly compared to the collar.

The magnetometer measurements made at 166 while the sensor housing is slowly rotating and the updated eddy current compensation terms are processed downhole at 172 (also depicted at 180 in FIG. 9B) to compute new magnetometer bias. This new magnetometer bias, the eddy current compensation terms, the magnetometer measurements, and the wellbore inclination are evaluated at 174 to compute the wellbore azimuth ψ. The computed wellbore azimuth and a previous wellbore azimuth may be further processed at 176 with a Kalman filter to compute a corrected (or smoothed or filtered) wellbore azimuth. The wellbore inclination and the wellbore azimuth may then be optionally used for wellbore position and trajectory control at 178 while drilling continues in 162. For example, the direction of drilling in 162 may be adjusted in response to the inclination and azimuth (e.g., by adjusting the positions of blades or other actuating components in a rotary steerable tool) to continue drilling along a predetermined path.

With continued reference to FIG. 9, a state model for the Kalman filter may be given, for example, as follows:

$$\beta_{k+1} = G\beta_k + \omega$$

In one example, $$\beta_k = \begin{pmatrix} \psi \\ \dot{\psi} \end{pmatrix}_k$$

The measurement model may be defined as given below in which the updated eddy current compensation term(s) $\gamma$ is/are computed as described above.

$$\psi_{tempk} = H \begin{pmatrix} \psi \\ \dot{\psi} \end{pmatrix}_k + \varepsilon_\psi$$

where $\omega_{temp\,k}$ is a temporary azimuth and H=(1 0). The latest $\psi_{temp\,k}$ may be derived from the modified magnetometer readings with the latest bias and $\gamma$. For example, the magnetometer reading may be corrected using the following equation.

$$\begin{pmatrix} \hat{B}_x \\ B_y \\ B_z \end{pmatrix}_i = \begin{pmatrix} 1 & 0 & 0 \\ 0 & 1 & -\gamma\omega \\ 0 & \gamma\omega & 1 \end{pmatrix}^{-1} \left( \begin{pmatrix} B_x \\ B_y \\ B_z \end{pmatrix}_i - \begin{pmatrix} b_x \\ b_y \\ b_z \end{pmatrix} \right)$$

Note that the magnetometer measurements are corrected to remove the bias and to compensate for the eddy current induced effect on the magnetometer measurements.

The azimuth, dip, and total magnetic field may be computed as follows from the measured accelerometer and magnetometer measurements.

$$\psi_{tempk} = \operatorname{atan}\left( \frac{(G_y \hat{B}_z - G_z \hat{B}_y)\sqrt{G_x^2 + G_y^2 + G_z^2}}{\hat{B}_x(G_y^2 + G_z^2) - G_x(G_y \hat{B}_y + G_z \hat{B}_z)} \right)$$

$$D_k = \operatorname{asin}\left( \frac{(G_y \hat{B}_z + G_z \hat{B}_y + G_z \hat{B}_y)}{\sqrt{G_x^2 + G_y^2 + G_z^2}\sqrt{\hat{B}_x^2 + \hat{B}_y^2 + \hat{B}_z^2}} \right)$$

$$B_{totk} = \sqrt{\hat{B}_x^2 + \hat{B}_y^2 + \hat{B}_z^2}$$

The system prediction step may be given as follows:

$$\sqrt{\beta}_{k+1} = G\beta_k$$

$$\sqrt{C}_{k+1} = GC_k G^T + R$$

The Kalman gain calculation is given below.

$$K_{k+1} = \sqrt{C}_{k+1} H^T (H\sqrt{C}_{k+1} H^T + Q)^T$$

The state vector and covariance matrix may be updated with measurements, for example, as follows:

$$\beta_{k+1} = \sqrt{\beta}_{k+1} + K_{k+1}(\psi_{temp\,k} - H\sqrt{\beta}_{k+1})$$

$$C_{k+1} = (E - K_{k+1} H)\sqrt{C}_{k+1}$$

With continued reference to FIG. 9B, both eddy current compensation terms $\gamma_c$ and $\gamma_s$ and the magnetometer bias are updated independently from the Kalman filter. The bias components may be estimated using downhole multi-station analysis (MSA). In this example embodiment, the bias determination includes detecting the slow sensor housing rotation and collecting multiple sets of magnetometer measurements (e.g., over at least 2 full rotations of the sensor housing). The magnetometer bias may be evaluated using MSA (as described in more detail below). An optional quality control step may be employed before outputting an updated magnetometer bias.

An example measurement model for the MSA is given below.

$$B_i = \begin{pmatrix} B_x \\ B_y \\ B_z \end{pmatrix}_i = K(\psi, \gamma, B, b_x, b_y, b_z, I, D, \phi) + \begin{pmatrix} w_{B_x} \\ w_{B_y} \\ w_{B_z} \end{pmatrix}$$

where w ($w_{B_x}$, $w_{B_y}$, and $w_{B_z}$) represents the error and K may be defined from the measurement model discussed above:

The system vector x includes at least the magnetometer bias $b_x$, $b_y$, and $b_z$ and may optionally further include other known parameters such as B, D, and/or $\psi$. It may be advantageous to include one or more of the other known parameters, for example, to provide quality control checks on the computed bias. One example system vector x is given below:

$$x = \begin{pmatrix} \psi \\ B \\ b_x \\ b_y \\ b_z \end{pmatrix}$$

In this example, other parameters (such as I, $\gamma_s$, $\gamma_c$, $\omega_s$, $\omega_c$, D, and $\phi$) are considered to be known and are input as constants into the MSA model. Since the relationship between the system vector and the observed magnetic field measurements is non-linear, the problem may be advantageously solved using a non-linear optimization, such as the Gauss-Newton method to minimize w.

The Jacobian matrix of K over the system vector x is given below.

$$J_K = \frac{\partial K}{\partial x}$$

where the components of $J_K$ may be obtained as described above.

With continued reference to FIG. 9, multiple sets of accelerometer and magnetometer measurements may be made while slowly rotating the sensor housing at 164. These multiple survey sets may be assumed to have the same azimuth and inclination (since the depth of the wellbore is essentially unchanged in the short period of time over which the multiple sets are collected), but different toolface angles (since the sensor housing is slowly rotating while the multiple sets are collected). The measurements may be expressed, for example, as follows:

$$\begin{pmatrix} B_1 \\ \vdots \\ B_n \end{pmatrix} = \begin{pmatrix} K_1 \\ \vdots \\ K_n \end{pmatrix}_x + \begin{pmatrix} w_1 \\ \vdots \\ w_n \end{pmatrix}$$

The system vector x may be estimated by repeating the following equation:

$$x_{j+1} = x_j + \left( \begin{pmatrix} J_{K1} \\ \vdots \\ J_{Kn} \end{pmatrix}_{x_j}^T \begin{pmatrix} J_{K1} \\ \vdots \\ J_{Kn} \end{pmatrix}_{x_j} \right)^{-1} \begin{pmatrix} J_{K1} \\ \vdots \\ J_{Kn} \end{pmatrix}_{x_j}^T \left( \begin{pmatrix} B_1 \\ \vdots \\ B_n \end{pmatrix} - \begin{pmatrix} K_1 \\ \vdots \\ K_n \end{pmatrix}_{x_j} \right)$$

The recursive process ends when the process converges with the error being less than a threshold, where:

error=norm($x_{j+1}-x_j$)

Though dip angle is used to estimate the bias, B is also estimated and may be used to QC the estimated bias parameters.

It will be appreciated that the above-described procedure may be further utilized to correct accelerometer bias, for example, by including accelerometer bias terms in the system vector x. Accelerometer bias may also be corrected, for example, as described in commonly assigned U.S. Pat. No. 9,945,222.

Figure 10:
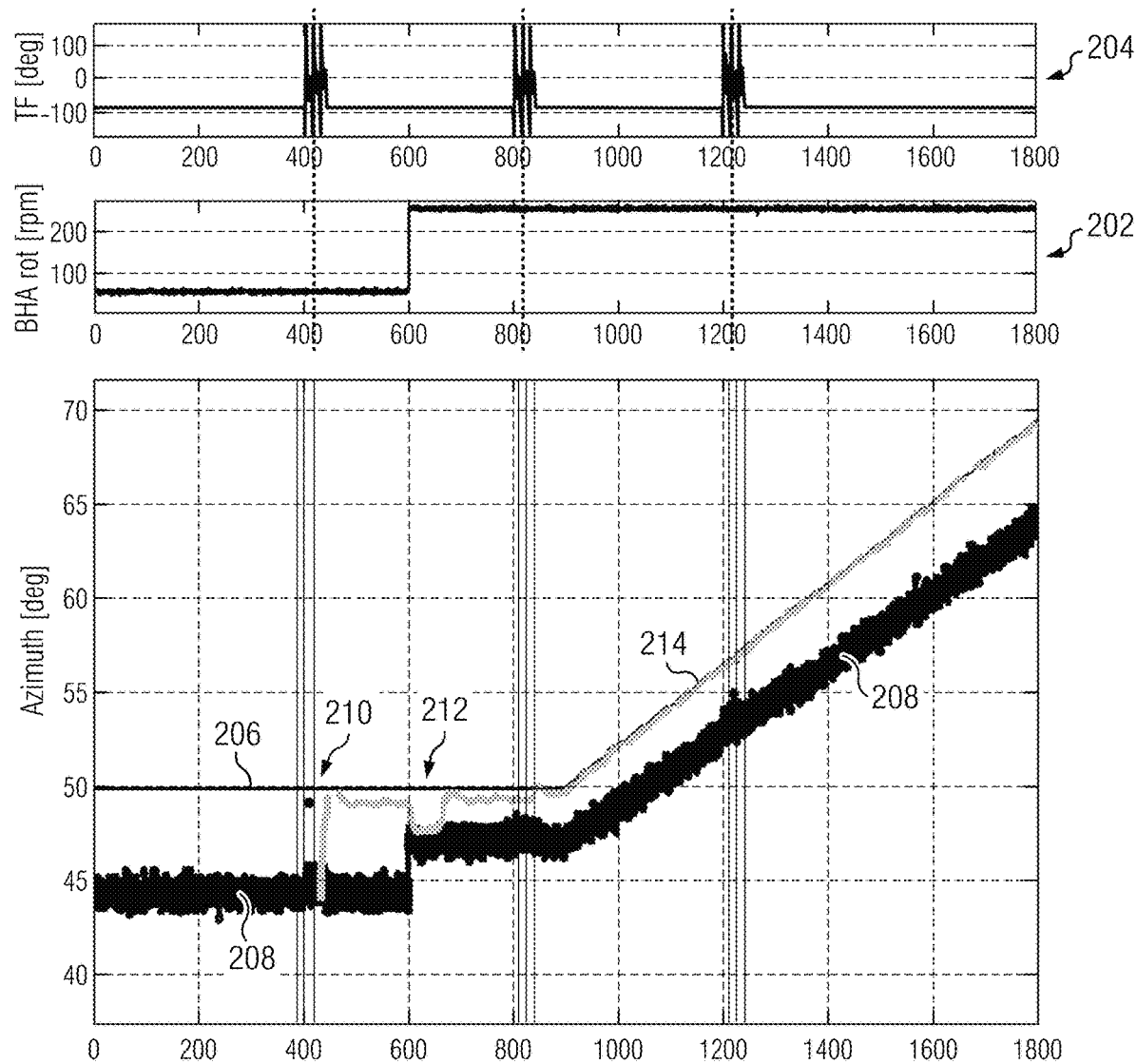
FIG. 10 depicts plots of sensor housing toolface, drill collar rotation rate, and wellbore azimuth with time for a synthetic example implementation of the methods depicted in FIG. 9.

The effectiveness of methods 160 and 160' is now shown in more detail by way of the following non-limiting synthetic example. FIG. 10 depicts plots of sensor housing toolface, drill collar rotation rate, and wellbore azimuth with time. In this example, the drill collar rotation rate 202 increased from about 60 rpm to about 240 rpm at 600 seconds. The sensor housing slowly rotated through 4 full rotations at 4 rpm at 400, 800, and 1200 seconds and was otherwise geostationary at a toolface angle of −90 degrees as indicated at 204. The true wellbore azimuth 206 was constant at 50 degrees from 0 to 900 seconds and then increased linearly with time to 70 degrees at 1800 seconds. The wellbore azimuth computed using the original magnetometer measurements was from about 3 to about 6 degrees less than the true wellbore azimuth as indicated at 208. At about 400 seconds (at 210) the magnetometer bias was corrected using the methodology described above with respect to FIG. 9, however, the eddy current compensation was arbitrarily set to a default value based on the size (e.g., diameter) of the collar. The resulting wellbore azimuth measurements were about 1 degree less than the true wellbore azimuth (owing to the uncompensated eddy currents). At about 600 seconds, the rotation rate of the drill collar increased to about 240 rpm further increasing the eddy current error as shown at 212. At about 650 seconds the eddy current compensation term was updated but the magnetometer bias remained the same as the correction made at 400 seconds. Note that the azimuth error was significantly decreased but still significant. At about 800 and 1200 seconds the eddy current compensation terms and the magnetometer bias were updated simultaneously as described above with respect to FIG. 9. The resulting wellbore azimuth estimates were within about 0.1 degree or less of the true wellbore azimuth as shown at 214.

With further reference to the methods disclosed in FIGS. 6, 7, and 9, it will be appreciated that the computed survey parameters (e.g., the wellbore inclination and wellbore azimuth) may be stored in downhole memory and/or transmitted to the surface, for example, via mud pulse telemetry, electromagnetic telemetry, wired drill pipe, or other telemetry techniques. In some embodiments, the accuracy of the wellbore inclination and wellbore azimuth may be sufficient such that the drilling operation may forego the use of conventional static surveying techniques. In such embodiments, the wellbore survey may be constructed at the surface based upon the transmitted measurements and/or downhole using a downhole processor.

With still further reference to FIGS. 6, 7, and 9, the computed survey parameters may be used to control and/or change the direction of drilling. For example, in many drilling operations the wellbore (or a portion of the wellbore) is drilled along a drill plan, such as a predetermined direction (e.g., as defined by the wellbore inclination and the wellbore azimuth) or a predetermined curvature. In some embodiments, the computed wellbore inclination and wellbore azimuth may be compared with a desired inclination and azimuth. The drilling direction may be changed, for example, in order to meet the drill plan, or when the difference between the computed and desired direction (inclination and azimuth) or curvature exceeds a predetermined threshold. Such a change in drilling direction may be implemented, for example, via actuating steering elements in a rotary steerable tool deployed above the bit (such as one of the rotary steerable tools described above). In some embodiments, the survey parameters may be computed in roll-stabilized housing in the RSS, which may further evaluate the survey parameters and the drill plan to compute a new drilling direction in order to meet the plan. In some embodiments the survey parameters may be sent to the surface using telemetry so that the survey parameters may be analysed. In view of the survey parameters, drilling parameters (e.g., weight on bit, rotation rate, mud pump rate, etc.) may be modified and/or a downlink may be sent to the RSS to change the drilling direction. In some embodiments both downhole and surface control may be used It will be appreciated that the methods described herein may be configured for implementation via one or more controllers deployed downhole (e.g., in a rotary steerable tool or in an MWD tool). A suitable controller may include, for example, a programmable processor, such as a digital signal processor or other microprocessor or microcontroller and processor-readable or computer-readable program code embodying logic. A suitable processor may be utilized, for example, to execute the method embodiments (or various steps in the method embodiments) described above with respect to FIGS. 6, 7, and 9. A suitable controller may also optionally include other controllable components, such as sensors (e.g., a temperature sensor), data storage devices, power supplies, timers, and the like. The controller may also be disposed to be in electronic communication with the accelerometers and magnetometers. A suitable controller may also optionally communicate with other instruments in the drill string, such as, for example, telemetry systems that communicate with the surface. A suitable controller may further optionally include volatile or non-volatile memory or a data storage device.

Although magnetometer bias and eddy current compensation for dynamic surveying and certain advantages thereof have been described in detail, it should be understood that various changes, substitutions and alterations may be made herein without departing from the spirit and scope of the disclosure.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

The invention claimed is:

1. A method for drilling a subterranean wellbore, the method comprising:
   (a) rotating a bottom hole assembly (BHA) in the subterranean wellbore to drill, the BHA including a drill collar, a drill bit, a roll-stabilized housing deployed in the drill collar and configured to rotate with respect to the drill collar, and a triaxial accelerometer set and a triaxial magnetometer set deployed in the roll-stabilized housing;
   (b) using the triaxial accelerometer set and the triaxial magnetometer set to make corresponding triaxial accelerometer measurements and triaxial magnetometer measurements while the BHA rotates in (a);
   (c) measuring a rotation rate of the drill collar while the BHA rotates in (a);
   (d) processing the triaxial accelerometer measurements to compute an inclination of the subterranean wellbore and a gravity toolface of the roll-stabilized housing; and
   (e) processing the computed inclination, the computed gravity toolface, the triaxial magnetometer measurements, and the measured rotation rate of the drill collar to compute an azimuth of the subterranean wellbore, wherein influences of eddy currents and magnetometer biases are accounted for in the computed azimuth,
   wherein the processing in (e) comprises:
      detecting a change in the measured rotation rate of the drill collar;
      processing the change in the measured rotation rate of the drill collar and the triaxial magnetometer measurements to compute an eddy current compensation term, wherein the eddy current compensation term is computed from a change in angle X when a change in the measured rotation rate of the drill collar is detected, wherein angle X is an angle between gravity and magnetic field vectors in a cross-axial plane of the drill collar; and
      inputting the computed inclination, the computed gravity toolface, the triaxial magnetometer measurements, the eddy current compensation term, and a magnetometer bias into a Kalman filter to compute the azimuth of the subterranean wellbore and an updated magnetometer bias.

2. The method of claim 1, further comprising:
   (f) changing a direction of drilling the subterranean wellbore in response to the inclination and the azimuth computed in (c) and (d).

3. The method of claim 2, wherein:
   the BHA further comprises a rotary steerable drilling tool deployed uphole from the drill bit, the roll-stabilized housing deployed in the rotary steerable drilling tool; and
   (f) further comprises actuating a steering element on the rotary steerable drilling tool to change the direction of drilling.

4. The method of claim 1, wherein the processing in (e) further comprises:
   inputting the computed inclination, the computed gravity toolface, the triaxial magnetometer measurements, the magnetometer bias, and the eddy current compensation term into the Kalman filter to compute the azimuth of the subterranean wellbore, the updated magnetometer bias, and an updated eddy current compensation term.

5. The method of claim 1, wherein the eddy current compensation term is equal to a derivative of angle X with respect to the rotation rate of the drill collar.

6. The method of claim 1, wherein the processing in (e) further comprises:
   acquiring triaxial magnetometer measurements while the roll-stabilized housing rotates with respect to the subterranean wellbore;
   processing the acquired triaxial magnetometer measurements to compute a magnetometer bias; and
   inputting the computed azimuth and a previous azimuth into the Kalman filter to compute a smoothed azimuth of the subterranean wellbore.

7. The method of claim 6, wherein:
   multiple sets of triaxial magnetometer measurements are acquired while the roll-stabilized housing rotates; and
   the magnetometer bias is computed using the multiple sets of triaxial magnetometer measurements and an assumption that the subterranean wellbore has identical azimuth and inclination for each of the multiple sets.

8. The method of claim 6, further comprising:
   detecting the rotation of the roll-stabilized housing; and
   processing a change in rotation rate of the roll-stabilized housing and the triaxial magnetometer measurements to compute a roll-stabilized housing eddy current compensation term.

9. A rotary steerable system for drilling a subterranean wellbore, the system comprising:
   a roll-stabilized housing deployed in a drill collar, the drill collar configured to rotate with a drill string, the roll-stabilized housing configured to rotate independent of the drill collar while drilling;
   a rotation rate sensor configured to measure a rotation rate of the drill collar;
   a triaxial accelerometer set and a triaxial magnetometer set deployed in the roll-stabilized housing; and
   a controller deployed in the roll-stabilized housing configured to (i) cause the triaxial accelerometer set and the triaxial magnetometer set to make corresponding triaxial accelerometer measurements and triaxial magnetometer measurements, (ii) cause the rotation rate sensor to make drill collar rotation rate measurements while drilling; (iii) process the triaxial accelerometer measurements to compute an inclination of the subterranean wellbore and a gravity toolface of the roll-stabilized housing; and (iv) process the computed inclination, the computed gravity toolface, the triaxial magnetometer measurements, and the measured rotation rate of the drill collar to compute an azimuth of the subterranean wellbore, wherein influences of eddy currents and magnetometer biases are accounted for in the computed azimuth,
   wherein the controller is further configured in (iv) to:
      detect a change in the measured rotation rate of the drill collar;

process the change in the measured rotation rate of the drill collar and the triaxial magnetometer measurements to compute an eddy current compensation term, wherein the eddy current compensation term is computed from a change in angle X when a change in the measured rotation rate of the drill collar is detected, wherein angle X is an angle between gravity and magnetic field vectors in a cross axial plane of the drill collar; and use a Kalman filter to compute the azimuth of the subterranean wellbore and an updated magnetometer bias from the computed inclination, the computed gravity toolface, the triaxial magnetometer measurements, the eddy current compensation term, and a magnetometer bias.

10. The rotary steerable system of claim 9, wherein the controller is further configured to (v) actuate a steering element on the rotary steerable system to change a direction of drilling in response to the inclination and the azimuth computed in (iii) and (iv).

11. The rotary steerable system of claim 9, wherein the controller is further configured in (iv) to:
cause the roll-stabilized housing to rotate with respect to the subterranean wellbore;
acquire triaxial magnetometer measurements while the roll-stabilized housing rotates;
process the acquired triaxial magnetometer measurements to compute a magnetometer bias; and
inputting the computed azimuth and a previous azimuth into the Kalman filter to compute a smoothed azimuth of the subterranean wellbore.

12. A method for drilling a subterranean wellbore, the method comprising:
(a) rotating a bottom hole assembly (BHA) in the subterranean wellbore to drill, the BHA including rotary steerable system having a roll-stabilized housing deployed in and configured to rotate with respect to a drill collar, a triaxial accelerometer set and a triaxial magnetometer set deployed in the roll-stabilized housing;
(b) causing the roll-stabilized housing to rotate at a lower rotational speed than a rotational speed of the BHA;
(c) using the triaxial accelerometer set and the triaxial magnetometer set to make multiple sets of corresponding triaxial accelerometer measurements and triaxial magnetometer measurements while the BHA rotates in (a) and the roll-stabilized housing rotates in (b);
(d) measuring a rotation rate of the drill collar while the BHA rotates in (a);

(e) processing the triaxial accelerometer measurements to compute an inclination of the subterranean wellbore and a gravity toolface of the roll-stabilized housing;
(f) detecting a change in the measured rotation rate of the drill collar;
(g) processing the change in the measured rotation rate of the drill collar and the triaxial magnetometer measurements to compute an eddy current compensation term of the drill collar;
(h) processing the triaxial magnetometer measurements and the eddy current compensation term of the drill collar to compute a magnetometer bias, wherein the magnetometer bias is computed using the multiple sets of triaxial magnetometer measurements and an assumption that the subterranean wellbore has identical azimuth and inclination for each of the multiple sets; and
(i) processing the computed inclination, the computed gravity toolface, the triaxial magnetometer measurements, the eddy current compensation term of the drill collar, and the magnetometer bias to compute an azimuth of the subterranean wellbore.

13. The method of claim 12, further comprising:
(j) actuating a steering element on the rotary steerable system to change a direction of drilling in response to the inclination and azimuth computed in (e) and (i).

14. The method of claim 12, further comprising:
(j) inputting the computed azimuth and a previously computed azimuth into a Kalman filter to compute a smoothed azimuth of the subterranean wellbore.

15. The method of claim 12, wherein (g), (h), and (i) further comprise:
(g) processing the change in the measured rotation rate of the drill collar, a rotation rate of the rotating roll-stabilized housing, and the triaxial magnetometer measurements to compute the eddy current compensation term of the drill collar and an eddy current compensation term of the roll-stabilized housing;
(h) processing the triaxial magnetometer measurements, the eddy current compensation term of the drill collar, and the eddy current compensation term of the roll-stabilized housing to compute the magnetometer bias; and
(i) processing the computed inclination, the computed gravity toolface, the triaxial magnetometer measurements, the eddy current compensation term of the drill collar, the eddy current compensation term of the roll-stabilized housing, and the magnetometer bias to compute the azimuth of the subterranean wellbore.

* * * * *